US008041993B2

(12) United States Patent
Matsubara et al.

(10) Patent No.: US 8,041,993 B2
(45) Date of Patent: Oct. 18, 2011

(54) DISTRIBUTED CONTROL SYSTEM

(75) Inventors: Masahiro Matsubara, Tokai (JP); Kohei Sakurai, Munich (DE); Kotaro Shimamura, Hitachinaka (JP); Nobuyasu Kanekawa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 274 days.

(21) Appl. No.: 12/194,575

(22) Filed: Aug. 20, 2008

(65) Prior Publication Data

US 2009/0089627 A1 Apr. 2, 2009

(30) Foreign Application Priority Data

Sep. 27, 2007 (JP) ................................ 2007-250410

(51) Int. Cl.
*G06F 11/00* (2006.01)

(52) U.S. Cl. ................ 714/11; 714/4.1; 714/45; 714/48

(58) Field of Classification Search ................ 714/4, 10, 714/11, 30, 45, 47, 47.1, 48, 4.1; 370/216
See application file for complete search history.

(56) References Cited

U.S. PATENT DOCUMENTS

| | | | | |
|---|---|---|---|---|
| 5,285,381 | A * | 2/1994 | Iskarous et al. | 714/11 |
| 6,038,683 | A * | 3/2000 | Shimamura et al. | 714/11 |
| 6,141,770 | A * | 10/2000 | Fuchs et al. | 714/11 |
| 6,199,179 | B1 * | 3/2001 | Kauffman et al. | 714/11 |
| 6,754,846 | B2 * | 6/2004 | Rasmussen et al. | 714/11 |
| 7,231,543 | B2 * | 6/2007 | Lee et al. | 714/11 |
| 7,376,498 | B2 | 5/2008 | Sakurai et al. | |
| 2004/0255185 | A1 * | 12/2004 | Fujiyama et al. | 714/4 |
| 2006/0015231 | A1 | 1/2006 | Yoshimura et al. | |
| 2007/0076593 | A1 | 4/2007 | Sakurai et al. | |
| 2009/0177915 | A1 * | 7/2009 | Dominic | 714/4 |

FOREIGN PATENT DOCUMENTS

| | | |
|---|---|---|
| JP | 2005-306124 | 11/2005 |
| JP | 2006-051922 | 2/2006 |
| JP | 2007-126127 | 5/2007 |

OTHER PUBLICATIONS

Yoneda, Kajiwara, Tsuchiya, “Dependable System”, published by Kyoritsu-Shuppan (Nov. 2005).

* cited by examiner

*Primary Examiner* — Robert Beausoliel, Jr.
*Assistant Examiner* — Joseph D Manoskey
(74) *Attorney, Agent, or Firm* — Antonelli, Terry, Stout & Kraus, LLP.

(57) ABSTRACT

There is provided a distributed system having a plurality of nodes connected by a network. Each of the nodes includes: a common-parameter-value determining unit for determining a common-parameter-value from values of a parameter (each value being possessed by a corresponding one of the nodes); a common-operation execution unit for executing a common-operation using, as its input, a value of the parameter or the common-parameter-value; a send/receive unit for exchanging, via the network, the parameter values used for the determination of the common-parameter-value and the results of the common-operation execution with the other nodes; and a fault identification unit that compares the common-operation execution results collected from all the nodes and determines that an error occurs if not all the results are the same.

6 Claims, 13 Drawing Sheets

1-1
NODE 1
3-1 MAIN MEMORY
2-1 CPU
STORAGE
I/F 5-1
COMMON-INPUT-VALUE DETERMINING UNIT 41-1
COMMON-OPERATION EXECUTION UNIT 42-1
FAULT IDENTIFICATION UNIT 43-1
SEND/RECEIVE PROCESSING UNIT 44-1
ERROR COUNTER UNIT 45-1
FAULT IDENTIFICATION RESULT 46-1
4-1
6
1-2 NODE 2
1-n NODE n

START
DETERMINATION OF COMMON-INPUT-VALUE (IS)
210
EXECUTION OF COMMON-OPERATION (CP)
220
EXCHANGE OF CP RESULT (EXC)
230
FAULT IDENTIFICATION (ID) & NOTIFICATION
240
END

NODE 1
NODE 2
NODE n
COMMUNICATION CYCLE a
COMMUNICATION CYCLE a+1
snd
rcv
310
320
330
340
P1
P2
EXCHANGE OF INPUT DATA
EXCHANGE OF CP RESULT (EXC)
PERFORMING OF COMMON-INPUT-VALUE DETERMINATION (IS)
PERFORMING OF MUTUAL MONITORING PROCEDURE
P1; DETERMINATION OF COMMON-INPUT-VALUE & EXECUTION OF COMMON-OPERATION (CP)
P2; FAULT IDENTIFICATION (ID) & NOTIFICATION COMMUNICATION CYCLE a
COMMUNICATION CYCLE a+1
COMMUNICATION CYCLE a+2
COMMUNICATION CYCLE a+3
COMMUNICATION CYCLE a+4
IS
CP
EXC
ID
IS
CP
EXC
ID
IS
CP
EXC
ID
IS
CP
EXC
ID

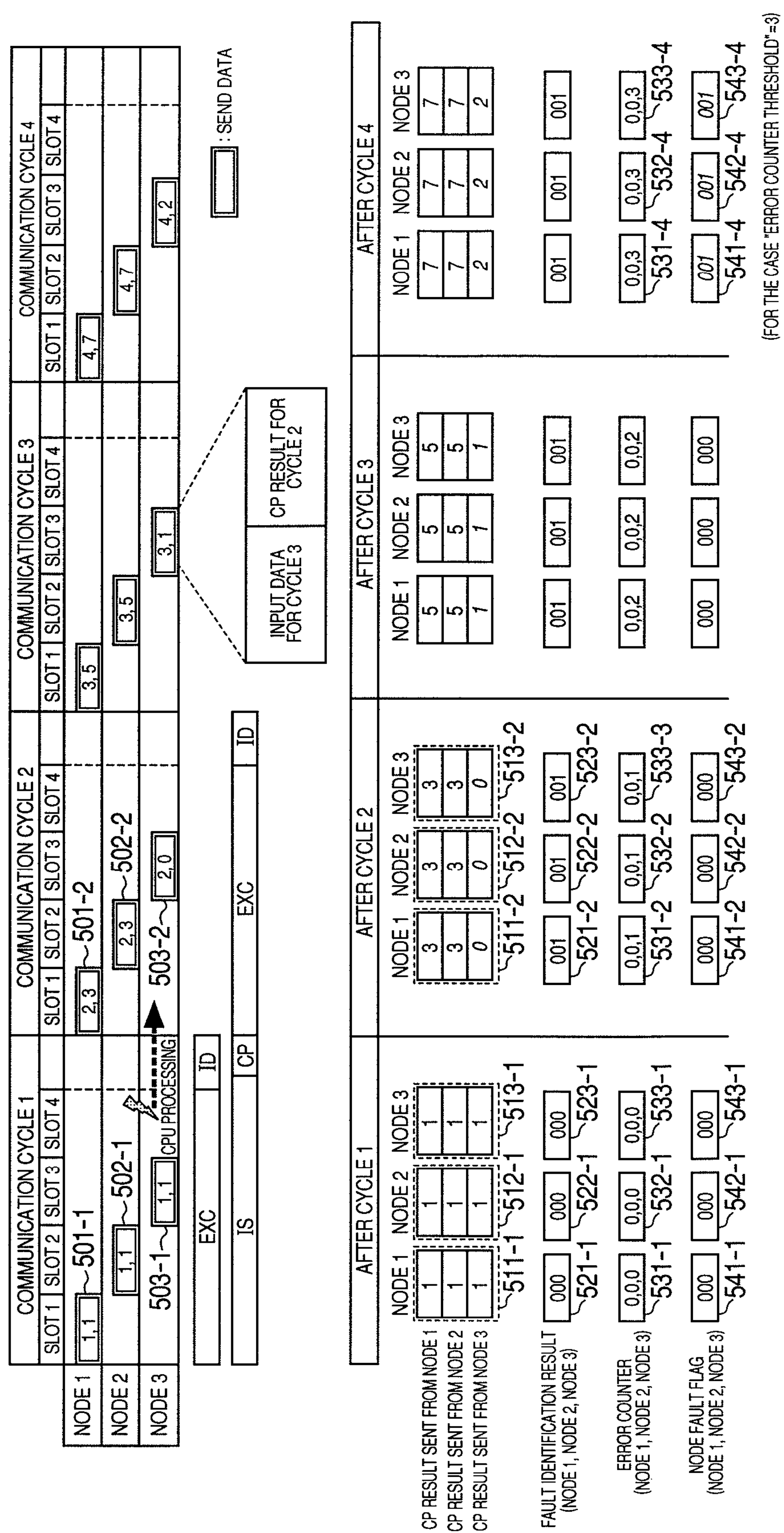
FIG. 5
COMMUNICATION CYCLE 1
COMMUNICATION CYCLE 2
COMMUNICATION CYCLE 3
COMMUNICATION CYCLE 4
SLOT 1
SLOT 2
SLOT 3
SLOT 4
NODE 1
NODE 2
NODE 3
CPU PROCESSING
EXC
ID
IS
CP
: SEND DATA
INPUT DATA FOR CYCLE 3
CP RESULT FOR CYCLE 2
AFTER CYCLE 1
AFTER CYCLE 2
AFTER CYCLE 3
AFTER CYCLE 4
CP RESULT SENT FROM NODE 1
CP RESULT SENT FROM NODE 2
CP RESULT SENT FROM NODE 3
FAULT IDENTIFICATION RESULT (NODE 1, NODE 2, NODE 3)
ERROR COUNTER (NODE 1, NODE 2, NODE 3)
NODE FAULT FLAG (NODE 1, NODE 2, NODE 3)
(FOR THE CASE "ERROR COUNTER THRESHOLD"=3)
501-1
502-1
503-1
501-2
502-2
503-2
511-1
512-1
513-1
521-1
522-1
523-1
531-1
532-1
533-1
541-1
542-1
543-1
511-2
512-2
513-2
521-2
522-2
523-2
531-2
532-2
533-3
541-2
542-2
543-2
531-4
532-4
533-4
541-4
542-4
543-4

COMMUNICATION CYCLE a
COMMUNICATION CYCLE a+1
COMMUNICATION CYCLE a+2
COMMUNICATION CYCLE a+3
COMMUNICATION CYCLE a+4
IS
CP
EXC
ID
EXC2
ID2

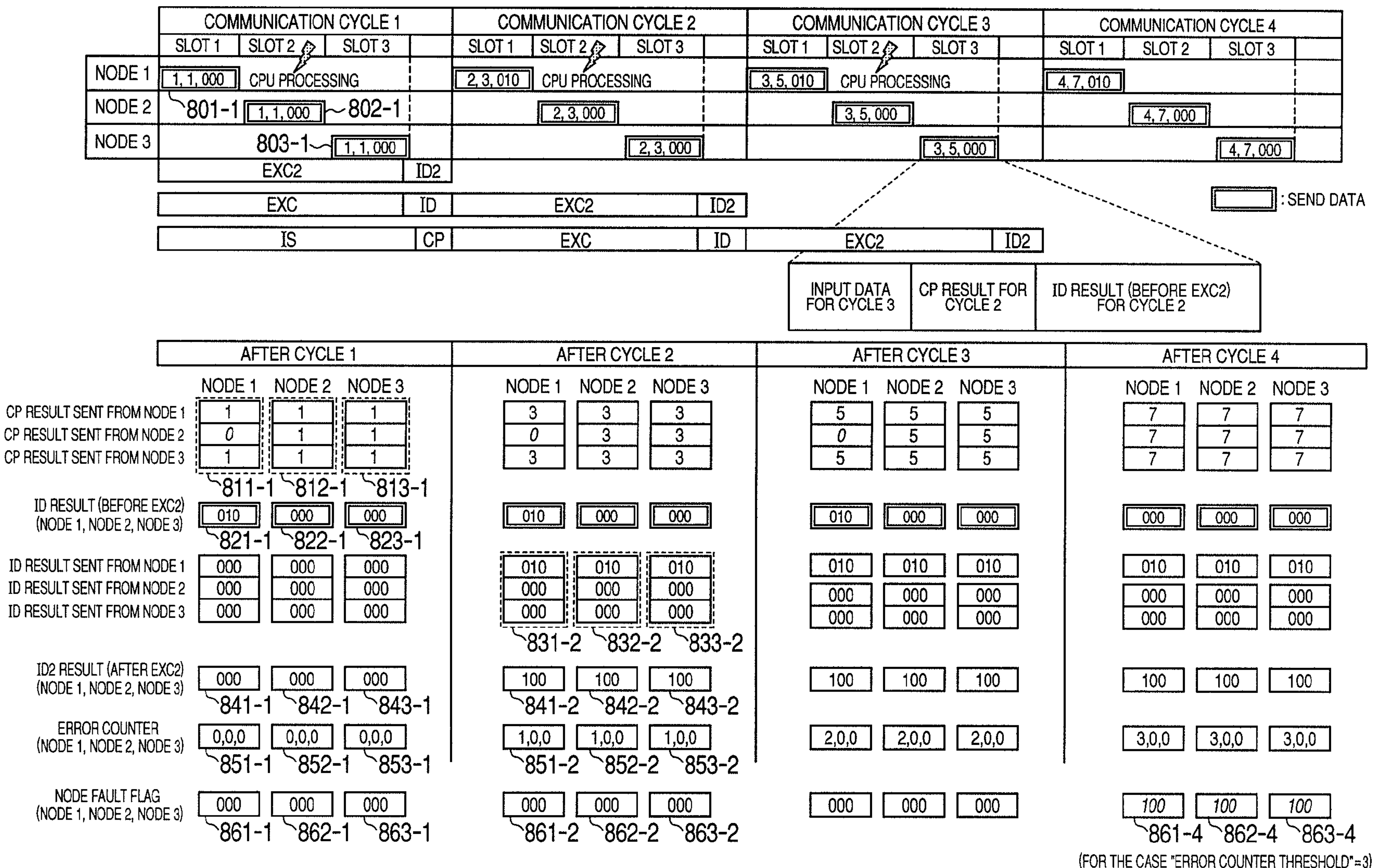
FIG. 8
COMMUNICATION CYCLE 1
COMMUNICATION CYCLE 2
COMMUNICATION CYCLE 3
COMMUNICATION CYCLE 4
SLOT 1
SLOT 2
SLOT 3
NODE 1
NODE 2
NODE 3
CPU PROCESSING
1, 1, 000
2, 3, 010
2, 3, 000
3, 5, 010
3, 5, 000
4, 7, 010
4, 7, 000
EXC2
EXC
IS
ID
CP
ID2
: SEND DATA
INPUT DATA FOR CYCLE 3
CP RESULT FOR CYCLE 2
ID RESULT (BEFORE EXC2) FOR CYCLE 2
AFTER CYCLE 1
AFTER CYCLE 2
AFTER CYCLE 3
AFTER CYCLE 4
CP RESULT SENT FROM NODE 1
CP RESULT SENT FROM NODE 2
CP RESULT SENT FROM NODE 3
ID RESULT (BEFORE EXC2) (NODE 1, NODE 2, NODE 3)
ID RESULT SENT FROM NODE 1
ID RESULT SENT FROM NODE 2
ID RESULT SENT FROM NODE 3
ID2 RESULT (AFTER EXC2) (NODE 1, NODE 2, NODE 3)
ERROR COUNTER (NODE 1, NODE 2, NODE 3)
NODE FAULT FLAG (NODE 1, NODE 2, NODE 3)
(FOR THE CASE "ERROR COUNTER THRESHOLD"=3)
801-1
802-1
803-1
811-1
812-1
813-1
821-1
822-1
823-1
831-2
832-2
833-2
841-1
842-1
843-1
841-2
842-2
843-2
851-1
852-1
853-1
851-2
852-2
853-2
861-1
862-1
863-1
861-2
862-2
863-2
861-4
862-4
863-4

PERFORMING OF MUTUAL MONITORING PROCEDURE

P1'; RECEPTION OF INPUT DATA (IR) & EXECUTION OF COMMON-OPERATION (CP')

P2'; PERFORMING OF COMMON-INPUT-VALUE DETERMINATION (IT) & FAULT IDENTIFICATION (ID) & NOTIFICATIO

DISTRIBUTED CONTROL SYSTEM

CLAIM OF PRIORITY

The present application claims priority from Japanese patent application serial No. 2007-250410, filed on Sep. 27, 2007, the content of which is hereby incorporated by reference into this application.

FIELD OF THE INVENTION

The present invention relates to high reliability control systems in which multiple devices connected to a network cooperate.

BACKGROUND OF THE INVENTION

A type of control system configuration of is a distributed system. In distributed systems, multiple nodes (such as computers and controllers) cooperate by exchanging messages via a communication network. In such a distributed system, even when part of the system suffers from a fault, a remaining normal part can execute, on behalf the faulty part, tasks for which the faulty part has been responsible. Thus, a highly fault tolerant system can be achieved.

A problem with distributed systems is fault detection. Because nodes operate independently of each other, there can occur a situation in which not all the nodes share the same information on fault occurrences (such as the locations, types, timings thereof). Such information difference between nodes can cause the nodes to operate in contradiction to each other and can incur a system failure. So, in distributed control systems, it is important that all nodes can share the same information on fault occurrences.

A method by which nodes can share the same information on fault occurrences is a mutual node monitoring system. In mutual node fault monitoring methods, all the nodes independently monitor and detect node faults and the fault detection results obtained at all the nodes are exchanged thereamong via a network. Then, each node examines the collected fault detection results and makes a final fault determination. A method for making such final fault determination, for example, is to determine that there occurs a fault when the number of nodes which detects the fault exceeds a predetermined threshold (such as a majority thereof).

In general, such mutual fault monitoring and determination methods have a limitation as expressed by the below equation.

$$\text{The number of processes} \geqq 3\times(\text{the number of identifiable faults})+1 \quad (1)$$

In other words, at least four nodes need to join a mutual fault monitoring system if any fault identification is to be made. However, some small systems or subsystems may be configured with only three nodes. A technology is discussed which can perform fault identification even for systems with only three nodes (see Non-patent Document 1).

Non-patent Document 1: Yoneda, Kajiwara, Tsuchiya, “Dependable System”, published by Kyoritsu-Shuppan (November 2005)

SUMMARY OF THE INVENTION

In Non-patent Document 1, for example, a value of the same variable is inputted to each of three nodes and the outputs from the three nodes are compared. When two of the nodes output the same result and the other node outputs a different result, then the node outputting a different result can be identified to be faulty. However, not all the variable values inputted to the three nodes are always assured to be the same. So, the above method has a problem because if not all the variable values are the same, then naturally not all the corresponding outputs will be the same, and thus the effectiveness of the method is virtually lost.

An object of the invention is to provide a method capable of performing reliable fault identification even for systems with three nodes.

There is provided a distributed system having a plurality of nodes connected by a network, in which each node includes: a common-parameter-value determining unit for determining a common-parameter-value from values of a parameter, each value being possessed by a corresponding one of the nodes; a common-operation execution unit for executing a common-operation using, as its input, a value of the parameter or the common-parameter-value; a send/receive unit for exchanging, via the network, the parameter values used for the determination of the common-parameter-value and the results of the common-operation execution with the other nodes; and a fault identification unit that compares the common-operation execution results collected from all the nodes and determines that an error occurs if not all the results are the same.

The invention can provide a method capable of performing fault identification even for systems with three nodes.

BRIEF DESCRIPTION OF THE DRAWINGS

FIG. 5 illustrates an exemplary application of a mutual node monitoring procedure.

FIG. 8 illustrates an exemplary application of a mutual node monitoring procedure.

DESCRIPTION OF THE PREFERRED EMBODIMENTS

Embodiments of the invention will be described below with reference to the accompanying drawings.

Embodiment 1

Figure 1:
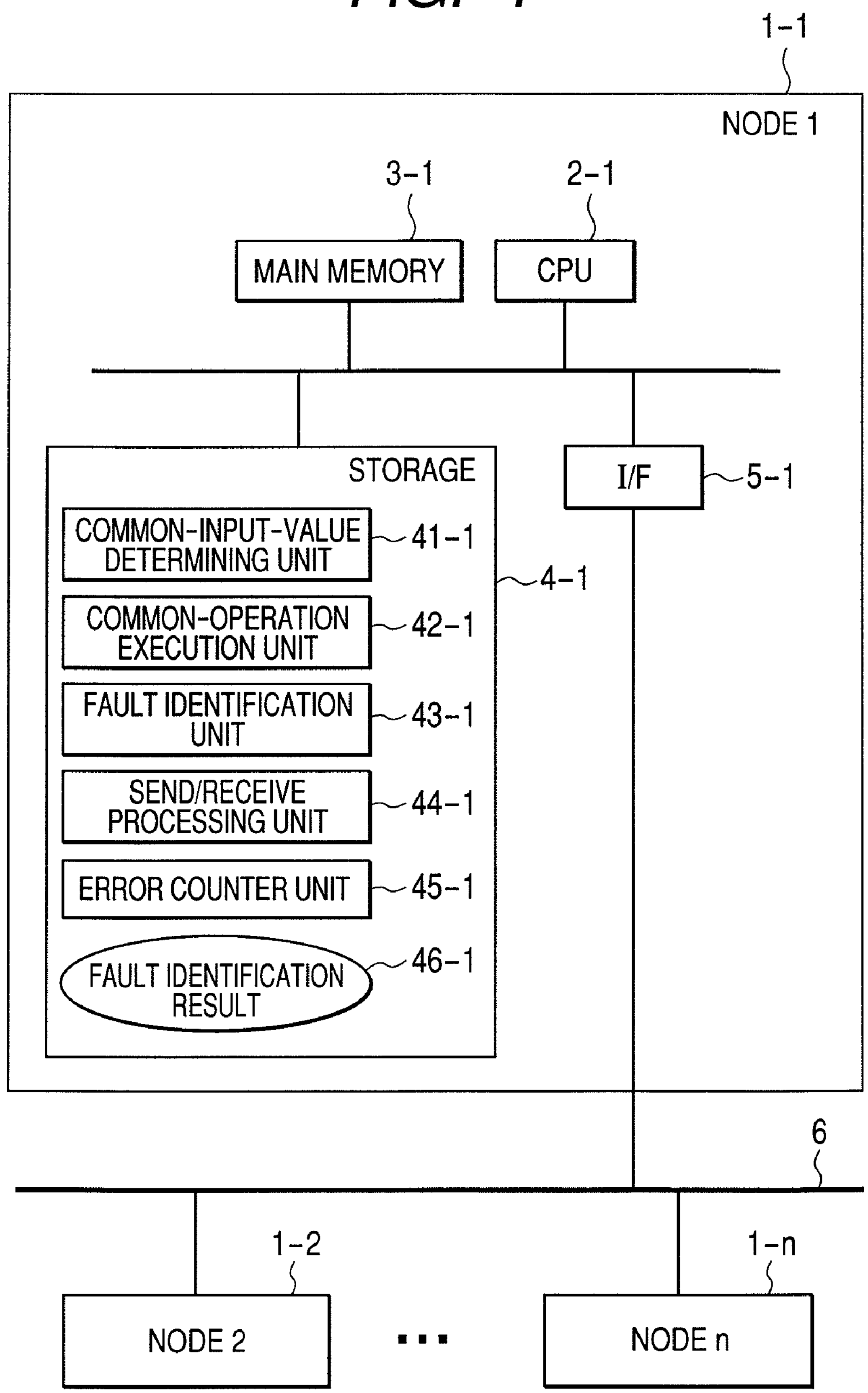
FIG. 1 is a block diagram of a system.

FIG. 1 is a block diagram of a distributed system.

The distributed system includes multiple nodes 1-1, . . . 1-n ($n \geqq 3$), which are connected to each other via a network 6.

Each node is a processing unit that can exchange information with the other nodes via the network, and includes various electronic controls, actuators and their drivers, sensors, etc.

Each node includes a CPU 2, a main memory 3, a storage 4, and an I/F 5 connected to the network 6, and communicates with the other nodes via the network 6.

The storage 4 stores programs for a common-input-value determining unit 41, common-operation execution unit 42, fault identification unit 43, send/receive processing unit 44 and error counter unit 45 as well as various data such as fault identification result 46.

The CPU 2 performs processes by loading those programs into the main memory 3 and executing them. The programs and data as described herein may be prestored in the storage or inputted from a storage medium such as a CD-ROM or downloaded from a different system via a network. In addition, functions performed by the programs may be implemented using dedicated hardware. Hereinbelow, the description will be made as if various processes are performed by such programs. It should be appreciated, however, that they actually are the CPUs that perform such processes.

The network 6 is a multiplex transmission network, in which a node can simultaneously broadcast the same information to all the other nodes connected to the network.

Figure 2:
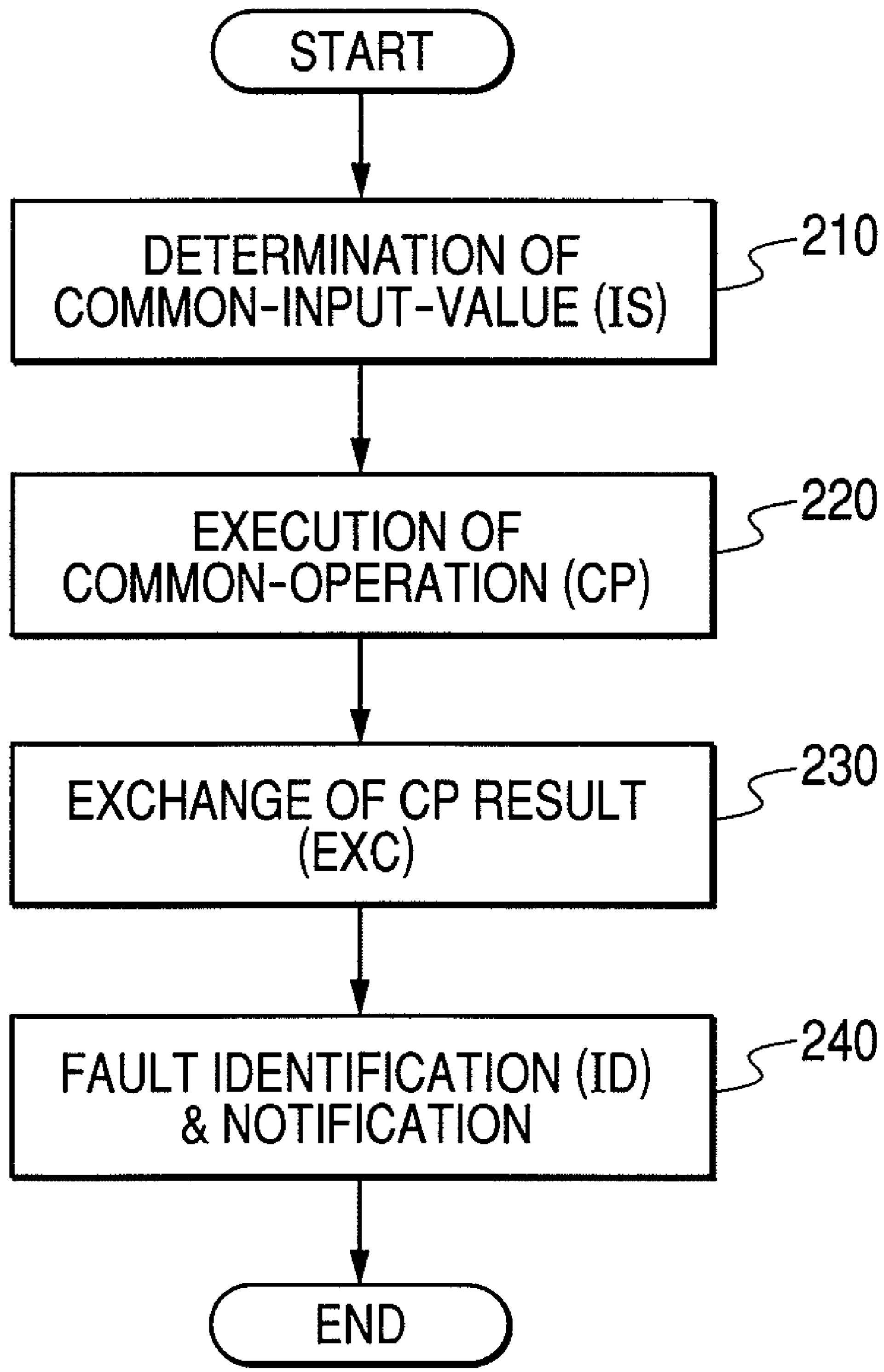
FIG. 2 is a flow chart of a fault identification procedure.

FIG. 2 is a flow chart of a fault identifying procedure.

All the nodes perform the respective fault identifying procedures while synchronously communicating with each other. The synchronization is achieved by communication via the network 6.

Initially, at the step 210 (IS step), the common-input-value determining unit 41 determines, using all the data (input data) of all the nodes, a common-input-value, which will be used as the input of the common-operation execution (CP) step. Specifically, the send/receive processing units 44 of all the nodes exchange their own input data with each other, and the common-input-value determining unit of each node determines a value (common-input-value) using the collected input data and a common rule shared by all the nodes. For example, a common-input-value is determined only when all the input data of all the nodes have the same value, and the same value is adopted as the common-input-value. If at least one of the input data is different from the others, no common-input-value may be determined or alternatively the majority-voting of the input data or the average value thereof or the center value of the range thereof may be adopted as the common-input-value. Here, when no common-input-value is determined, the steps after the step 220 are not carried out. The number of times no common-input-value can be determined may be counted at the error counter unit 45 and if the counter value exceeds a preset value, the entire system (all the nodes) may be shut down. In this manner, all the nodes will share the same common-input-value. It is preferred to use a parameter varying with time as the input data. For example, the number of communication cycles owned by each node can be used.

In the FlexRay communication protocol for vehicles, the synchronization of the global time (including the communication cycle number) is natively provided by hardware. When the FlexRay communication protocol is employed for the network 6 and the communication cycle number is used for the common-input-value determining procedure, the CPU burden of executing the common-input-value determining procedure at the step 210 can be alleviated. Therefore, the CPU power thus saved can be allocated to other processings, or low cost is achieved by employing a lower performance CPU. In a synchronized system such as the one employing the FlexRay protocol, all the nodes natively have the same communication cycle number, thus eliminating the explicit need for exchanging the communication cycle numbers among the nodes.

Next, the common-operation execution unit 42 inputs the common-input-value obtained at the step 210 and performs a CP step (step 220). The CP procedure is not particularly limited. For example, a simple arithmetic operation (such as [2x+1], where x is a common-input-value) is performed.

If a specific node function needs to be mutually monitored, the function is executed at the CP step at each node. The series of steps of FIG. 2 may be performed for each of various node functions, thereby enabling a plurality of monitor items to be mutually checked. Here, when the same common-input-value can be shared among the plurality of monitor items, the IS step needs not be repeated.

Then, the send/receive processing units 44 of all nodes exchange the CP results with one another at step 230 (hereinafter "EXC step"). This enables each node to collect and store the CP results obtained at all nodes including itself.

And then, at step 240, the fault identification unit 43 performs fault identification (ID) and notification procedures. Specifically, the step 240 examines the CP results collected at the step 230 and judges whether or not a majority of nodes who join the mutual fault monitoring have the same CP result. When only a minority of nodes have the same CP result, the ID result is not used for any fault identification. When a majority of nodes have the same CP result, the other nodes having a different result are determined to be erroneous. The fault identification result 46 includes a node fault flag i for indicating the presence of a fault in the node i. And, when the node i is identified to be faulty, the node fault flag i is set for notification. The system application may access such node fault flags as needed. Or alternatively, when a fault is identified, an interrupt may be immediately asserted to the system application, which in response thereto may check the node fault flags for any fault occurrence. The node fault flags are reset prior to the restart of the FIG. 2 procedure.

By the series of steps described above, a highly reliable fault identification method is achieved, and also the same information on fault occurrences is shared between nodes.

Figure 3:
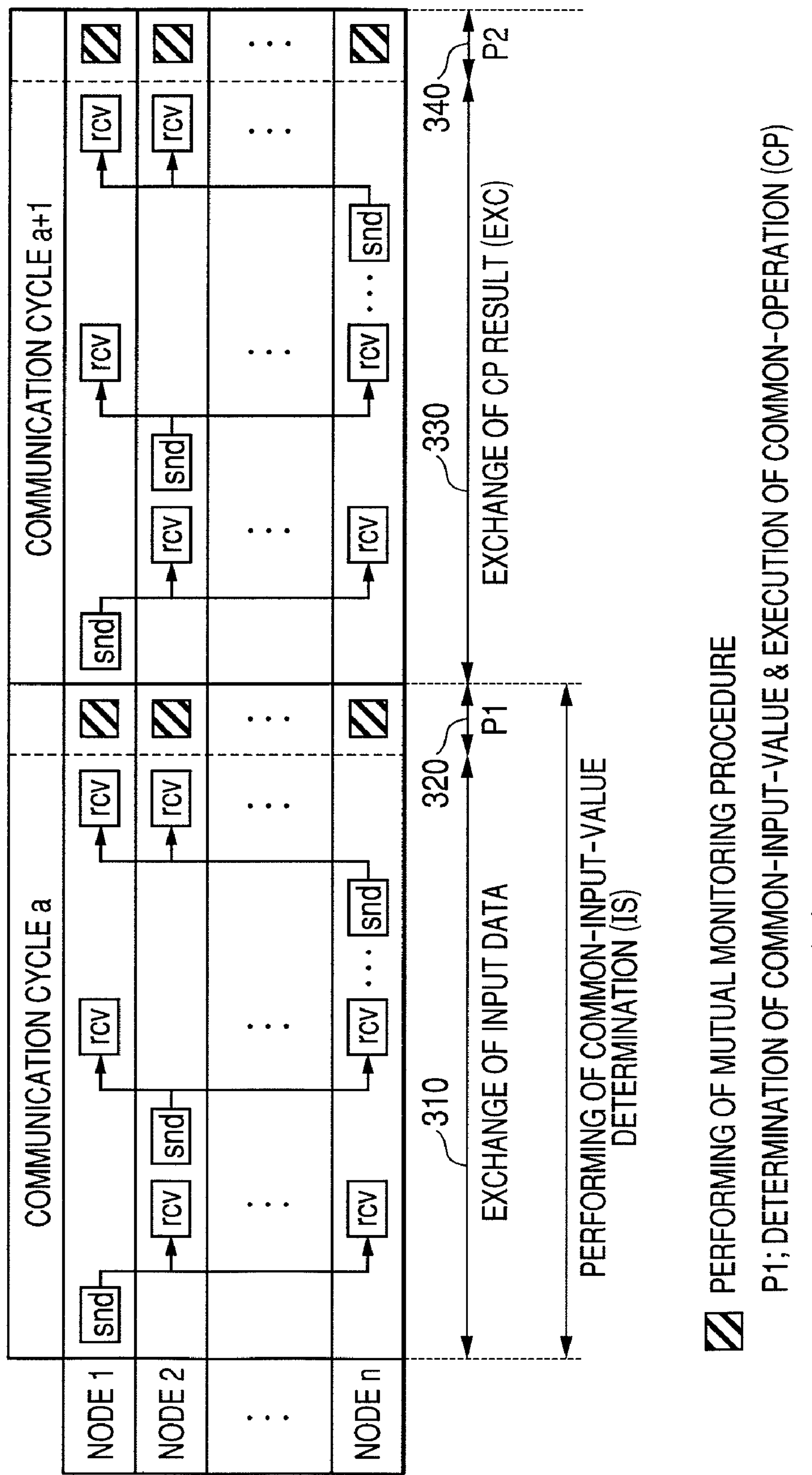
FIG. 3 illustrates relationship between communication cycles and the procedure of FIG. 2.

FIG. 3 illustrates relationship between communication cycles and the steps of FIG. 2.

During the first time span 310 of the communication cycle "a", exchange of the input data between nodes (part of the IS step) is performed. During the latter time span 320 of the cycle "a", determination of the common-input-value (also part of the IS step) and the CP step using the common-input-value are performed. During the first time span 330 of the communication cycle (a+1), the EXC step is performed. During the latter time span 340 of the communication cycle (a+1), the ID and notification step is performed. By these steps during these two cycles, an error for the cycle "a" is determined. Thus, the fault identification by the steps of FIG. 2 typically requires two communication cycles.

Figure 4:
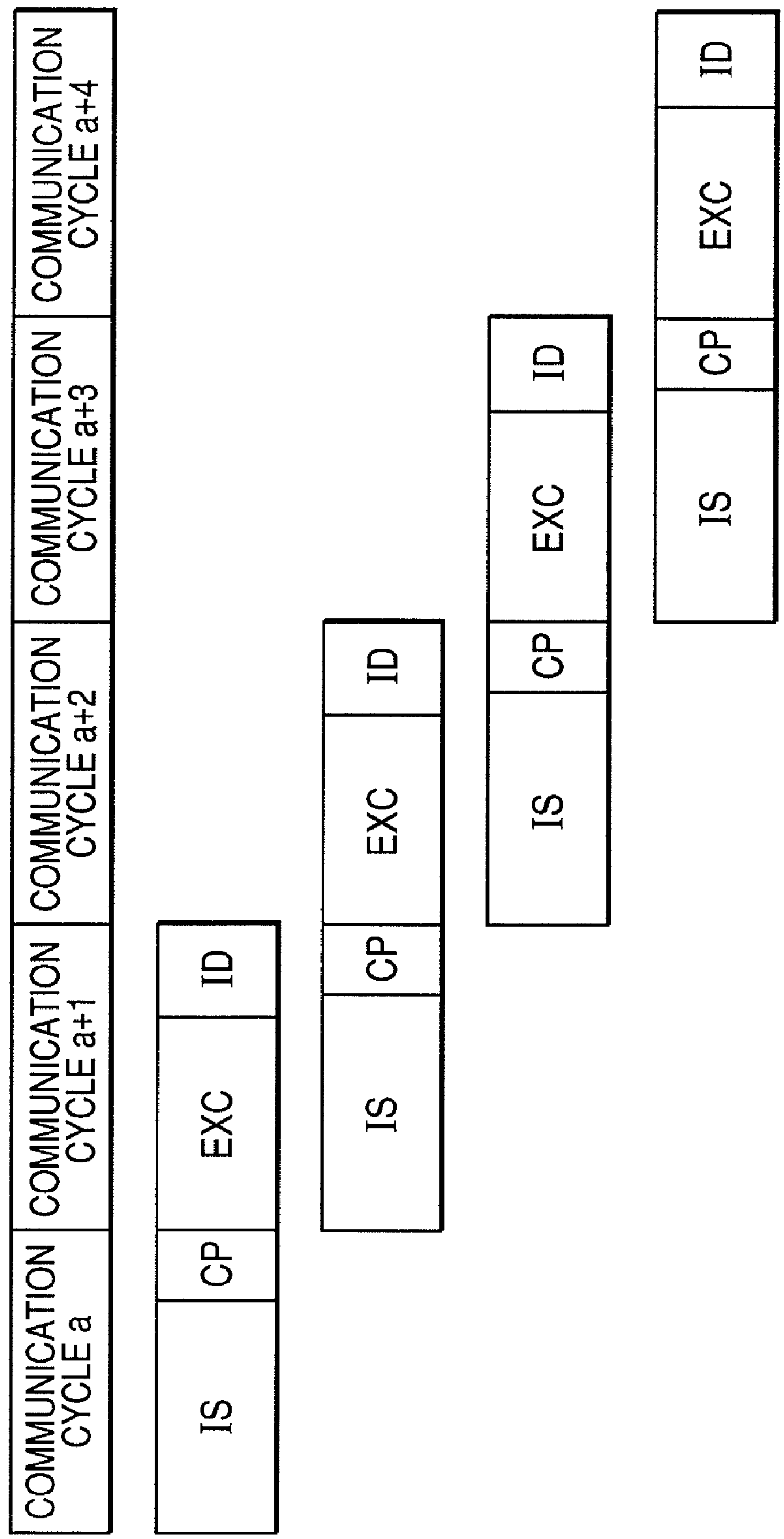
FIG. 4 illustrates a pipeline operation of a mutual node monitoring procedure.

The steps of FIG. 2 may be pipelined as shown in FIG. 4. That is, the input data exchange (part of the IS step) for the data possessed at the cycle (a+1) and the EXC step for the CP results obtained at the cycle "a" are simultaneously performed in the same send/receive operation during the cycle (a+1). And, the determination of the common-input-value (part of the IS step) for the input data exchanged at the cycle (a+1), the CP step for the common-input-value determined at the cycle (a+1) and the ID step for the CP results exchanged at the cycle (a+1) are continuously performed during the cycle (a+1). Thereby, an ID result can be obtained each communication cycle. Here, the common-input-value used for the CP step at the cycle "a" may be determined at the end of the cycle (a−1). In addition, the send/receive processing unit 44 may add other data such as control data to the above-described send data relating to the mutual node monitoring procedure.

When the fault identification unit 43 determines an error for a monitor item of a node, the corresponding error count may be incremented instead of immediately setting the corresponding node fault flag. That is, the node fault flag for a monitor item of a node is not set until the corresponding error count exceeds a preset threshold. When the fault identification unit 43 determines that no error occurs for a monitor item of a node, the corresponding error count may be decremented or reset. A procedure employed is prebuilt in an appropriate software or prewritten in an appropriate configuration file or the like. Alternatively, the error counter may be operated so that the error count for a node is decremented or reset only when there is no error for all monitor items of the node.

FIG. 5 illustrates an exemplary application of the mutual node monitoring procedure.

In this example, the mutual node monitoring steps are pipelined. The communication cycle number is used as the input data and an arithmetic operation ([2×"communication cycle number"]+1) is performed at the CP step.

At the slots 1, 2 and 3 of the communication cycle 1, the nodes 1, 2 and 3 sequentially send the respective input data (cycle numbers for the cycle 1) along with the respective CP results obtained at the previous cycle (501-1, 502-1 and 503-1). And each node receives the data sent from the other nodes. Since the current cycle number is "1", the cycle number sent from each node is "1". And, since the common-input-value for the previous cycle is "0" and 2×"0"+1=1, the CP result sent from each node is "1".

In each CP result table (511-1, 512-1 and 513-1), all the CP results of all the nodes for the cycle 0 have the same value; so, each node determines at the ID step that no node error occurs at the cycle 0. As a result, all the values of each ID result table (521-1, 522-1 and 523-1) are "0" indicating that there is no error. Also, all the values of each error counter (531-1, 532-1 and 533-1) and all the values of each node fault flag table (541-1, 542-1 and 543-1) remain unchanged.

Next, the common-input-value for the cycle 1 is determined. In this example, when at least two input data have the same value, the value is adopted as the common-input-value. Since all the input data for the cycle 1 are "1", the common-input-value is determined to be "1".

Then, the CP step for the common-input-value determined at the cycle 1 is performed, obtaining a result of "3". In this example, as shown, a CPU failure occurs at the node 3 after the sending operations of all the nodes during the cycle 1 and succeeding cycles. This disturbs the CP step of the node 3 during each cycle.

At the cycle 2, similarly to the cycle 1, the nodes 1-3 send the respective cycle numbers for the cycle 2 along with the respective CP results obtained at the cycle 1. Here, all the cycle numbers sent from all the nodes (in 501-2, 502-2 and 503-2) are "2". For the CP results, those sent from the nodes 1 and 2 (in 501-2 and 502-2) are "3", while that sent from the node 3 (in 503-2) is "0" due to the CPU failure. Thus, in each CP result table (511-2, 512-2 and 513-2), the CP result by the node 3 is different from the others; so, each node determines at the ID step that an error occurs in the node 3. So, the third bit of each ID result table (521-2, 522-2 and 523-3) is "1" indicating that there exists an error, while the other bits are "0". Accordingly, the corresponding error count (the third bit) in each error counter (531-2, 532-2 and 533-2) is incremented to "1". However, each node fault flag table (541-2, 542-2 and 543-2) still remains unchanged.

Similarly to the cycle 2, also at the cycles 3 and 4, the ID step determines that the node 3 has an error. Thus, in each node, the error count for the node 3 is incremented twice and becomes "3" after the ID step of the cycle 4 (531-4, 532-4 and 533-4). When the threshold error count for notifying a fault occurrence is preset at "3", the above error count exceeds the threshold. So, after the ID step at the cycle 4, the flag for the node 3 in each node fault flag table is set to "1" (see the third bit in each of 541-4, 542-4 and 543-4) and the system application is notified of the fault occurrence at the node 3. In the manner described above, a highly reliable fault identification method is achieved, and also the same information on fault occurrences is shared between nodes.

Embodiment 2

Figure 6:
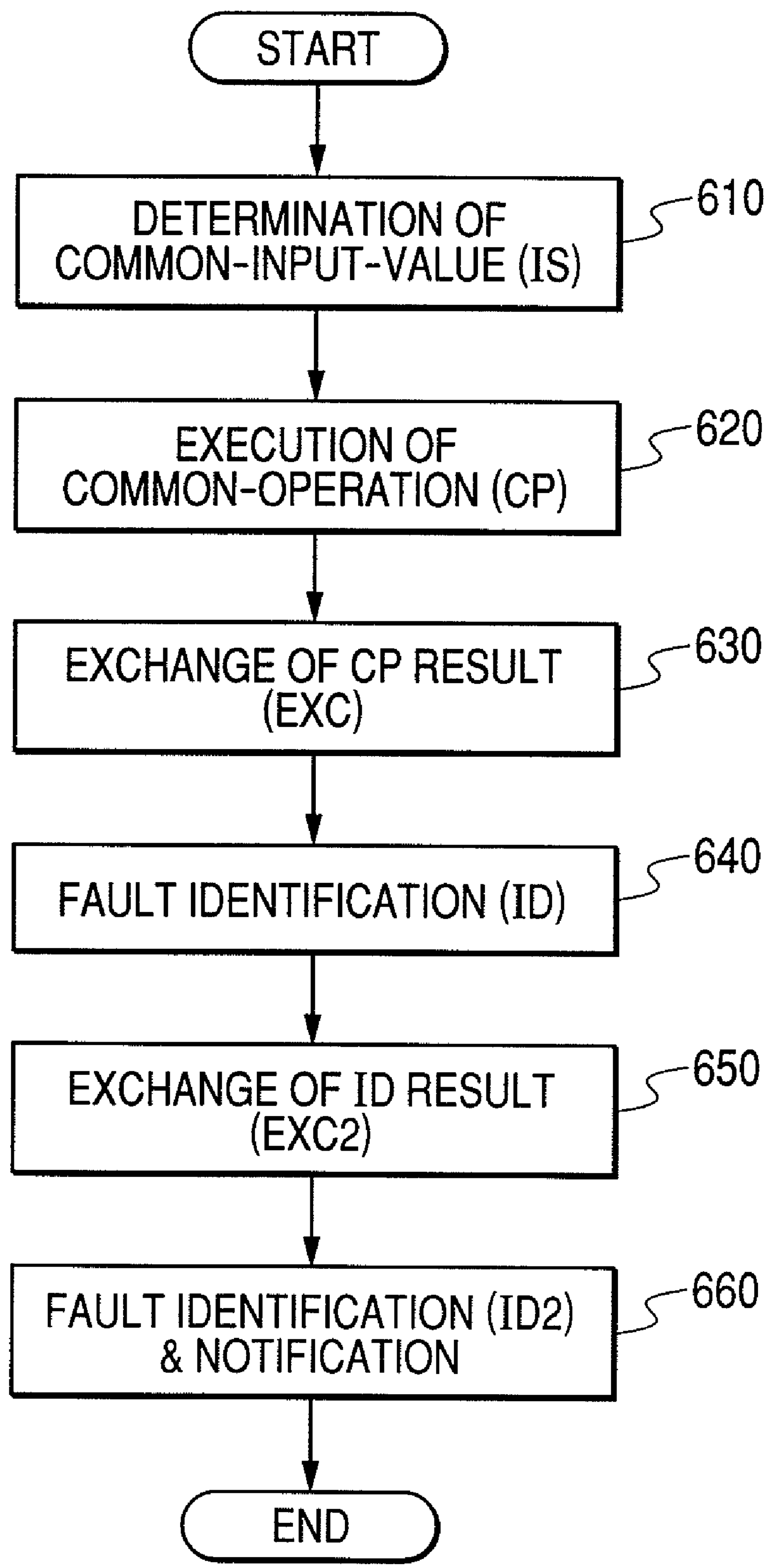
FIG. 6 is a flow chart of a mutual node monitoring procedure.

Besides the FIG. 2 procedure, fault identification by mutual node monitoring can also be achieved by a procedure shown in FIG. 6. Similarly to the FIG. 2 procedure, the FIG. 6 procedure is performed with all nodes synchronized with one another. While the mutual monitoring procedure of FIG. 2 is effective in identifying faults in sending nodes, that of FIG. 6 is effective in identifying faults in receiving nodes as well as faults in sending nodes. The procedure shown in FIG. 6 will be described below.

After steps 610-630 (similar to the steps 210-230 of FIG. 2), the fault identification unit 43 performs the ID step (step 640). Unlike the step 240 of FIG. 2, the step 640 does not perform any notification. That is, the ID result obtained at the step 640 is not used for operating the error counter or node fault flag table.

Next, the send/receive processing units 44 of all nodes exchange the ID results with one another at step 650 (hereinafter "EXC2 step"). This enables each node to collect and store the ID results obtained at all nodes including itself.

Then, the fault identification unit 43 performs fault identification (hereinafter ID2) and notification (step 660). Specifically, the step 660 examines the ID results collected at the step 650 and judges whether or not a majority of nodes who join the mutual fault monitoring have the same ID result. When only a minority of nodes have the same ID result, the ID2 result is not used for any fault identification. When a majority of nodes have the same ID result, the other nodes having a different result are determined to be erroneous. The fault identification result 46 includes a node fault flag i for indicating the presence of a fault in the node i. And, when the node i is identified to be faulty, the node fault flag i is set for notification. The procedure of this embodiment for notifying the system application of fault occurrences and resetting the fault flags is similar to that described in FIG. 2

As described above, when a node reports an ID result (for a monitor item of a node i) different from the others at an ID2 step, the node reporting a different result is determined to suffer from a reception error. More exactly, when a majority of nodes have the same ID result, the other nodes reporting a different result are determined to have a reception error. In other words, when although the ID step of the cycle "a" judges that a node has no error, the ID2 step of the cycle (a+1) judges that the node has an error, the node is determined to suffer from a reception error.

By contrast, when at an ID2 step, a majority of nodes have the same ID result indicating that there occurs an error in a sending node, the sending node is determined to have an error. In this case, also, the corresponding error count and node fault flag is similarly operated. In this manner as described above, a highly reliable method capable of identifying both faults in sending nodes and those in receiving nodes is achieved, and also the same information on fault occurrences can be shared between nodes.

The FIG. 6 fault identification (including the ID2 step) requires one more extra communication cycle for performing the EXC2 and ID2 steps in addition to the two cycles shown in FIG. 3. So, it typically requires three cycles in total. However, the number of communication cycles required for completing an ID2 step depends on the timing at which the error occurs. For example, when a reception error occurs at an EXC step, two cycles are needed for performing the ID2 step.

Although the above description is made for node faults, the invention can also be applied to network faults. For example, when the network 6 is configured with multiple lines, the data exchange and ID step of the mutual node monitoring procedure of FIG. 2 or 6 may be performed for each network line and then the results for all the network lines may be compared. In this case, when all the fault identification results for all the network lines show that an error occurs in a node, it is determined that the error really occurs in the node. If not, it is determined that the error occurs in a network line for which a different result is obtained.

Figure 7:
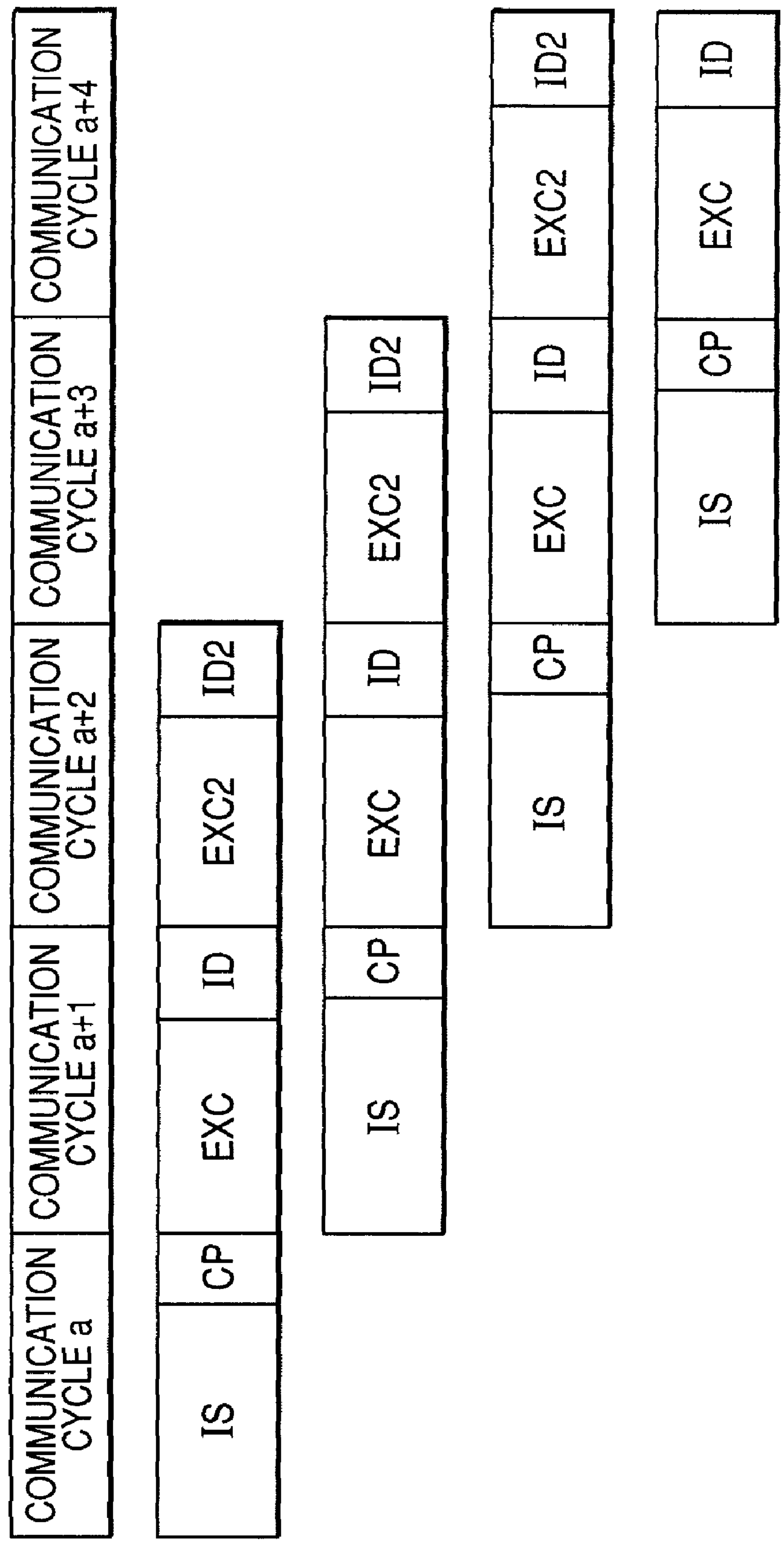
FIG. 7 illustrates a pipeline operation of a mutual node monitoring procedure.

The FIG. 6 procedure may be pipelined similarly to that described in FIG. 7. That is, the data exchange of the IS step for the input data of the cycle (a+2), the EXC step for the CP results obtained at the cycle (a+1) and the EXC2 step for the ID results obtained at the cycle (a+1) are simultaneously performed in the same send/receive operation during the cycle (a+2). And, the common-input-value determination of the IS step and the CP step for the input data of the cycle (a+2), the ID step for the CP results exchanged at the cycle (a+2) and the ID2 step for the ID results exchanged at the cycle (a+2) are continuously performed during the cycle (a+2). Thereby, an ID2 result can be obtained each communication cycle.

A specific operation of the fault identification according to the flow chart of FIG. 6 will be described below with reference to FIG. 8. In this example, the mutual node-fault monitoring steps are pipelined. And, the CP step and the input data used for the CP procedure are similar to those described in FIG. 5.

At the slots 1, 2 and 3 of the communication cycle 1, the nodes 1, 2 and 3 sequentially send the respective input data (cycle numbers of the cycle 1) along with the respective CP and ID results obtained at the previous cycle (801-1, 802-1 and 803-1). And each node receives those send data sent from the other nodes. Since the current cycle number is "1", the cycle number sent from each node is "1". And, since the common-input-value for the previous cycle is "0" and 2×"0"+1=1, the CP result sent from each node is "1".

At the ID step, each node examines the collected CP results (811-1, 812-1 and 813-1). The node 1 experiences a reception failure at the slot 2; therefore, at the node 1, the CP result sent from the node 2 is not "1" but "0" (811-1). Thus, although actually a reception error occurs at the node 1 at the cycle 1, only the node 1 judges that an error occurs in the node 2 at the cycle 0 (i.e., the second bit of the table 821-1 is "1"). However, the nodes 2 and 3 judge that no node error occurs at the cycle 0 (i.e., all the bits in the tables 822-1 and 823-1 are "0"). At this point, all the error counters (851-1, 852-1 and 853-1) and all the node fault flag tables (861-1, 862-1 and 863-1) remain unchanged.

Next, the common-input-value for the cycle 1 is determined. This step is similar to that described in FIG. 5 and a common-input-value of "1" is obtained. Then, the CP step for the cycle 1 is performed using this common-input-value, obtaining a result of "3".

As shown in the send data 801-2, 802-2 and 803-2, at the cycle 2, similarly to the cycle 1, the nodes 1-3 send the respective cycle numbers of the cycle 2 (all of them are "2"), the respective CP results obtained at the cycle 1 (all of them are "3") and the respective ID results (821-2, 822-2 and 823-2) for the input data of the cycle 0. Here, the ID results in the send data 802-2 and 803-2 (respectively of the nodes 2 and 3) are both "0, 0, 0". However, the node 1 has experienced a reception failure at the cycle 1; therefore, the ID result in the send data 801-2 of the node 1 is "0, 1, 0". So, the ID2 step of each node determines that an error occurs at the node 1 during the cycle 0 since only the node 1 has a different ID result (see 831-2, 832-2 and 833-2). As a result, the first bit of each of the ID2 result tables 841-2, 842-2 and 843-2 is set at "1" indicating that an error occurs at the node 1, and, at each node, the error count for the node 1 is incremented to "1" (851-2, 852-2 and 853-2). At this point, however, all the node fault flag tables remain unchanged (see 861-2, 862-2 and 863-2).

Similarly to the cycle 1, also during the cycles 2 and 3, the node 1 experiences a reception failure at the slot 2, and the ID step of the node 1 judges that the node 2 is erroneous. And, similarly to the cycle 2, also during the cycles 3 and 4, the ID2 step of each node determines that an error occurs at the node 1. As a result, in each node, the error count for the node 1 is incremented twice and becomes "3" after the ID2 step of the cycle 4 (see 851-4, 852-4 and 853-4). When the threshold error count for notifying a fault occurrence is preset at "3", the above error count exceeds this threshold. So, after the ID2 step at the cycle 4, the flag for the node 1 in each node fault flag table is set to "1" (see the first bit in each of 861-4, 862-4 and 863-4) and the system application is notified of the fault occurrence at the node 1.

In the manner described above, a highly reliable fault identification method is achieved, and also the same information on fault occurrences is shared between nodes. Although not described, identification of faults in sending nodes and sharing of the same information on such fault occurrences between nodes can also be achieved by the ID2 procedure of this embodiment similarly to the first embodiment. For example, a fault in a sending node as shown in FIG. 5 can be identified by using the steps of FIG. 6 as follows: At the cycle 3, the nodes send the respective ID results (521-1, 522-2 and 523-2) obtained at the cycle 2, and all the ID results are "0, 0, 1". As a result, the ID2 step of each node determines that there occurs an error in the sending node 3 and the corresponding error count for the node 3 is incremented.

Here, the error counter unit 45 may have two types of error counters, one for errors in sending nodes and the other for errors in receiving nodes, and the system application may be notified of fault occurrences in such a manner that it can discriminate the error types.

Embodiment 3

Figure 9:
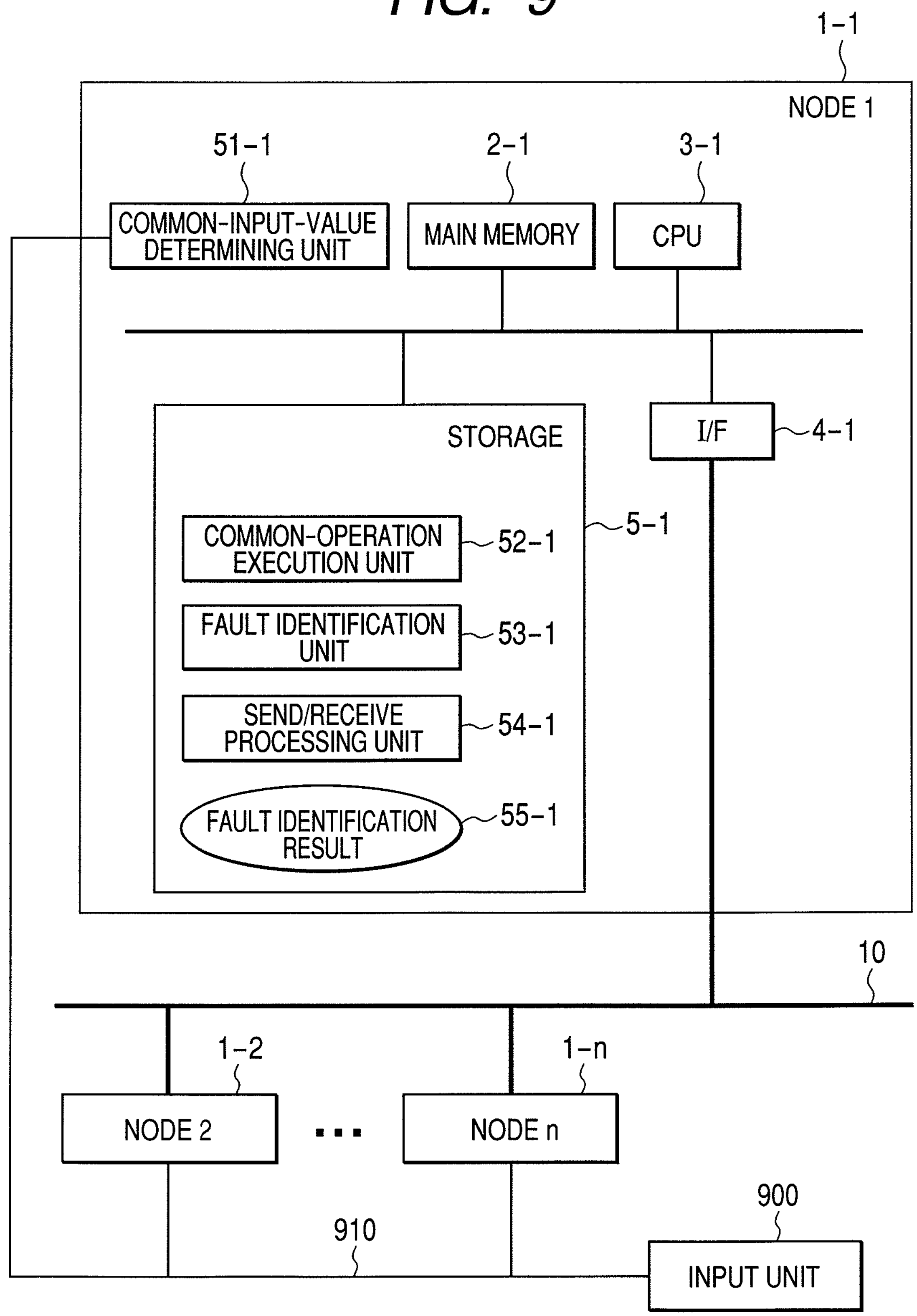
FIG. 9 is a block diagram of a system.

FIG. 9 is a block diagram of a distributed system. This system differs from the FIG. 1 system only in that the common-input-value determining unit 51 of each node is connected to an input unit 900 via a communication line 910. As for the configuration of the communication line 910, each node may be provided with a dedicated line such as a serial cable or all nodes may be connected via a single network.

The input unit 900 generates an input datum used for the mutual node monitoring procedure of FIG. 2 or 6, and delivers it to the common-input-value determining units 51. The input datum is generated from a sensor output signal or the like. Using all the input data received by all nodes or values processed therefrom at all nodes, the common-input-value determining unit 51 of each node provides a common-input-value by the IS procedure.

With the FIG. 9 configuration, the nodes can mutually monitor one another in a similar manner to that described in FIG. 2 or 6; in addition, normal nodes can acquire a normal datum (such as a sensor output signal) from the input unit 900 and also can determine a common-input-value when the number of abnormal nodes is small. So, when a plurality of nodes have a control and processing function for calculating various signals such as control signals and motor current command signals using, as its input, the data from the input unit 900, such function can be maintained even if a node fault occurs as long as at least one of the nodes with such function remains normal.

Such a control and processing function may be used for the CP procedure. In this case, the mutual node monitoring of this embodiment can be carried out by modifying the flow charts of FIGS. 2 and 6 to the flow charts of FIGS. 10 and 12, respectively.

Figure 10:
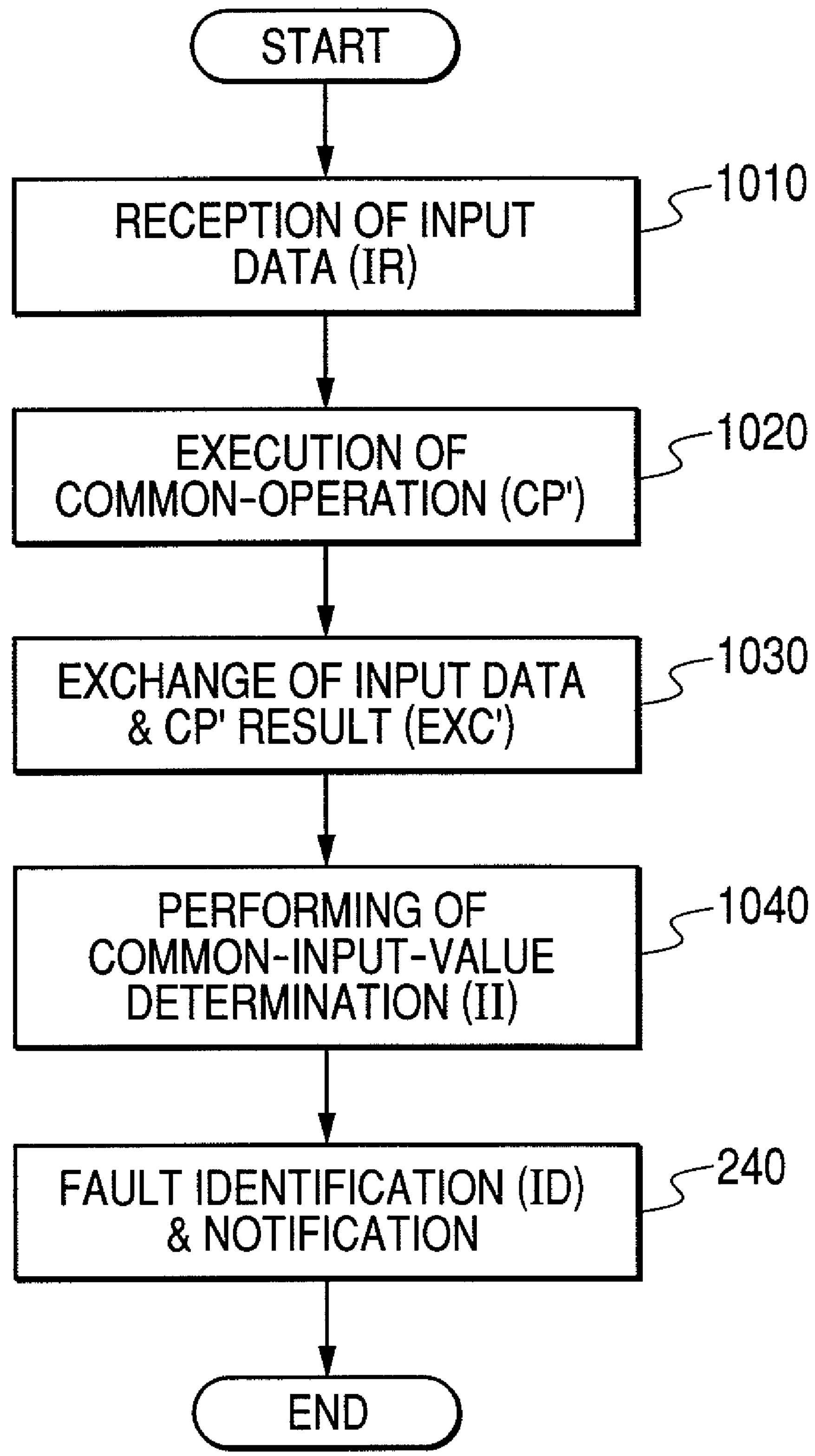
FIG. 10 is a flow chart of a mutual node monitoring procedure.

FIG. 10 is a flow chart illustrating the steps of a mutual node monitoring procedure.

At the step 1010 (IR step), the common-input-value determining unit 51 of each node receives an input datum from the input unit 900. Next, at the step 1020 (CP' step), the common-operation execution unit 52 executes a common-operation using the input datum received at the step 1010 instead of a common-input-value. The common-operation is the same as that used in the step 220 of FIG. 2. Then, at the step 1030, all the send/receive processing units 54 exchange the input data received at the step 1010 and the CP' results obtained at the step 1020 with one another. This enables each node to collect and store all the input data and CP' results obtained at all nodes including itself. Thus, in FIG. 10, the input data exchange of the step 210 (IS step) of FIG. 2 and the step 230 (EXC step) of FIG. 2 can be performed simultaneously, thereby reducing the number of procedural steps required for performing the mutual node monitoring.

Then, the step 1040 (II step) examines whether any common-input-value can be determined based on all the input data collected from all nodes at the step 1030. The condition under which any common-input-value can be determined is the same as that used in the step 210. The flow then proceeds to the step 240, thereby completing the procedure.

As described above, by the FIG. 10 procedure, the number of procedural steps required for performing the mutual node monitoring can be reduced compared to the FIG. 2 procedure while providing a comparable effect.

Figure 11:
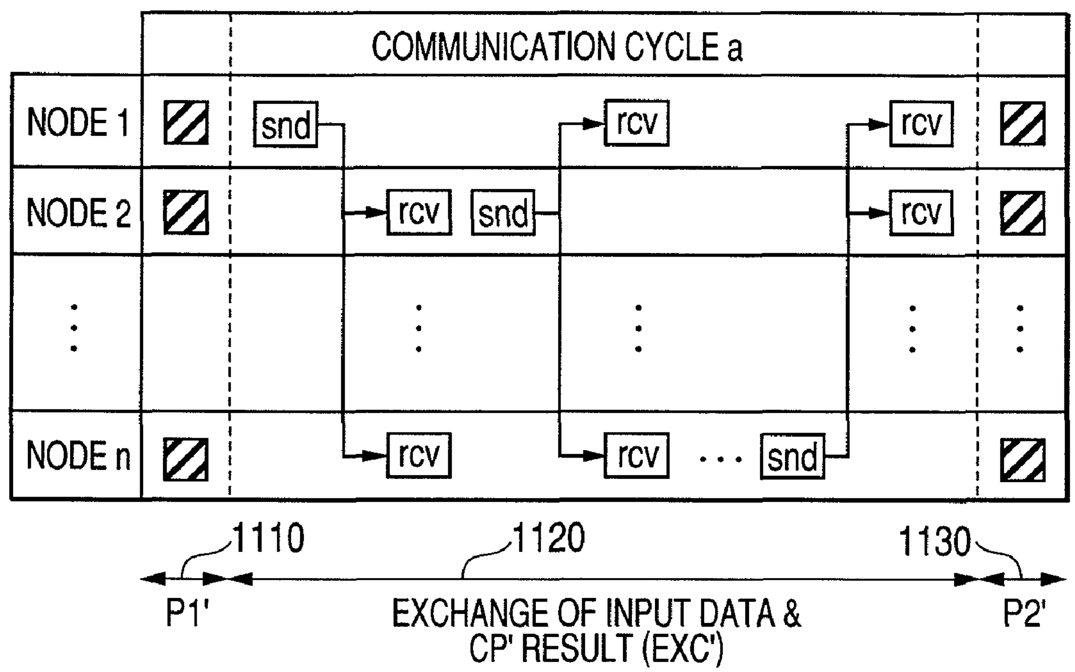
FIG. 11 illustrates relationship between communication cycles and a mutual node monitoring procedure.

FIG. 11 illustrates relationship between communication cycles and the mutual node monitoring procedure of FIG. 10. The first time span 1110 of the communication cycle "a" performs the IR and CP' steps. These steps may be performed at the end of the previous cycle. During the second time span 1120 of the cycle "a", the input data and CP' results of all nodes are exchanged with one another (EXC' step). During the last time span 1130 of the cycle "a", the II step and the ID and notification step are performed. Thus, each fault identification (ID) according to the FIG. 10 procedure typically requires one communication cycle.

Figure 12:
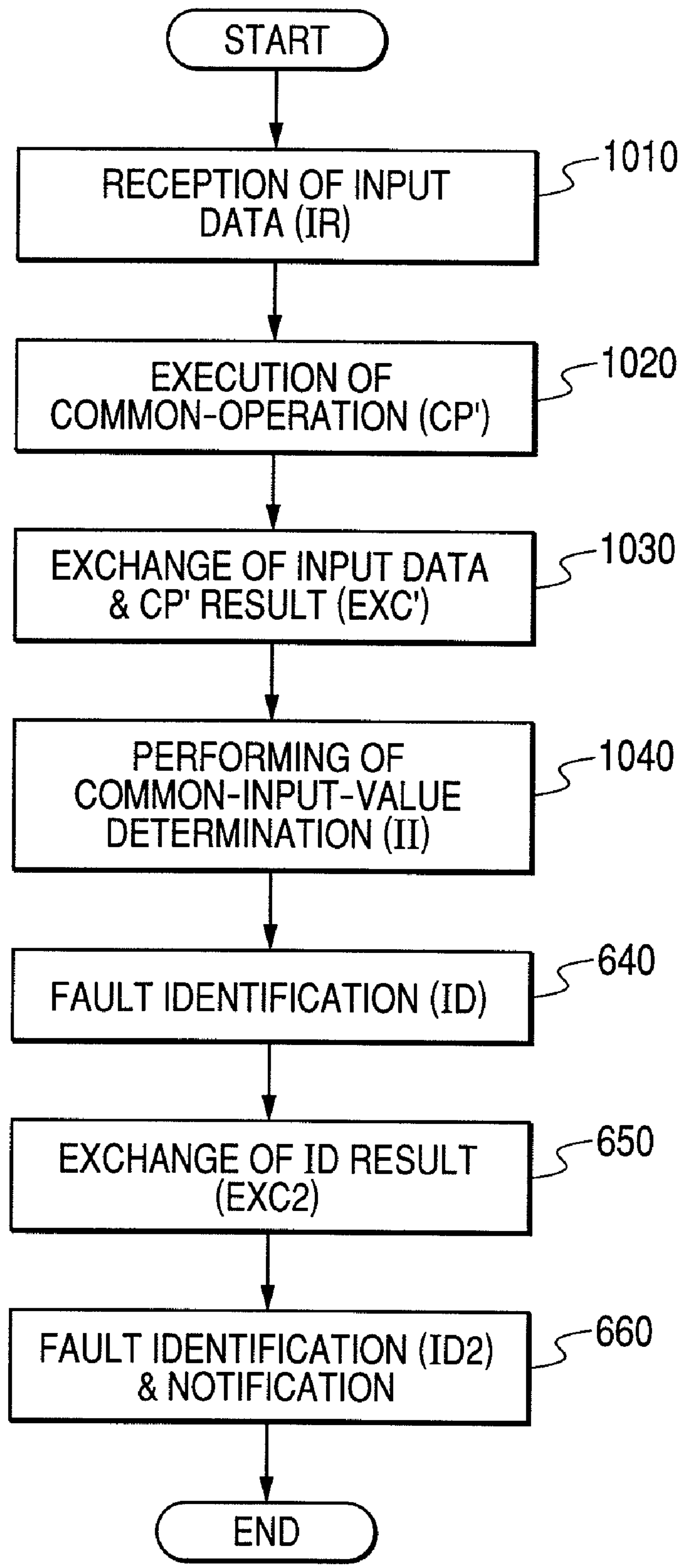
FIG. 12 is a flow chart of a mutual node monitoring procedure.

FIG. 12 is a flow chart of another mutual node monitoring procedure.

The FIG. 12 procedure is a combination of the FIG. 10 procedure and FIG. 6 procedure, in which the steps 1010-1040 are first performed and then the steps 640-660 are performed. Similarly to the FIG. 10 procedure, the FIG. 12 procedure can reduce the number of procedural steps required for performing the mutual node monitoring compared to the FIG. 6 procedure while providing a comparable effect.

The FIG. 12 fault identification (including the ID2 step) requires one more extra communication cycle for performing the EXC2 and ID2 steps in addition to the single cycle shown in FIG. 11. So, it typically requires two cycles in total.

Figure 13:
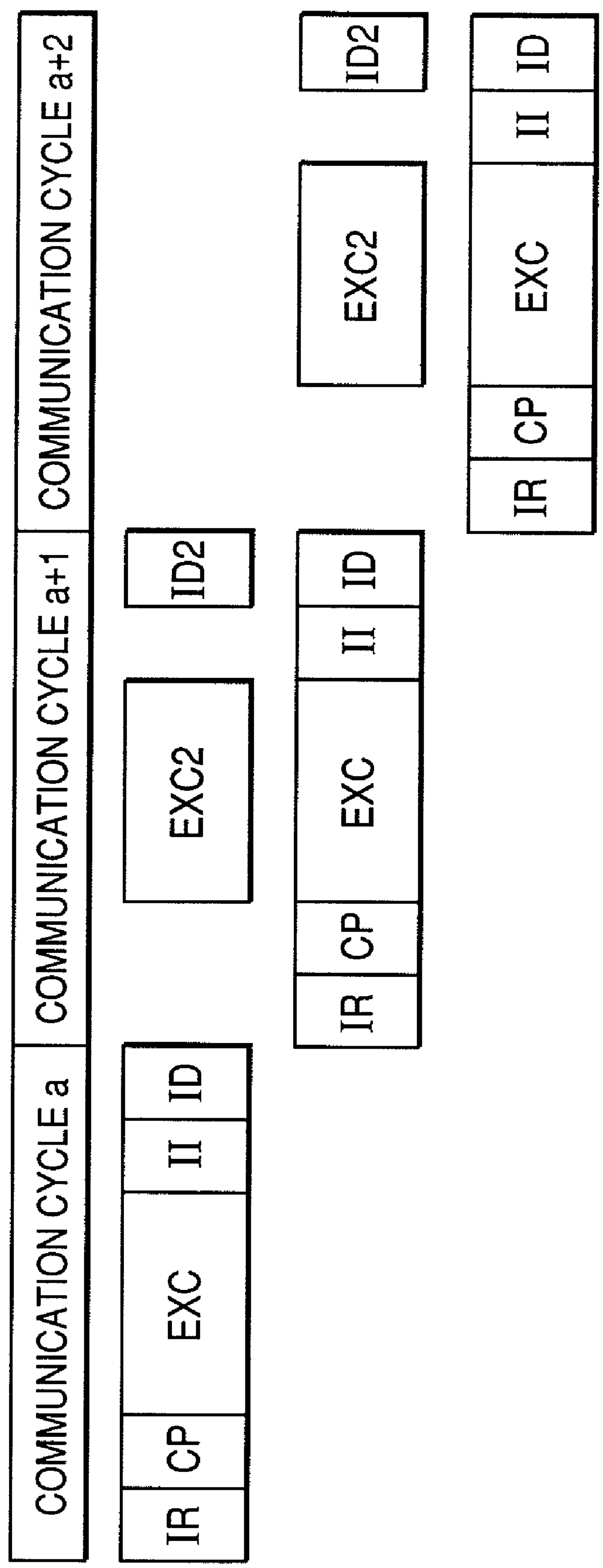
FIG. 13 illustrates a pipeline operation of a mutual node monitoring procedure.

The FIG. 12 procedure may be pipelined similarly to that described in FIG. 13. That is, the EXC' step for the CP' results obtained at the cycle (a+1) and the EXC2 step for the ID results obtained at the cycle "a" are simultaneously performed in the same send/receive operation during the cycle (a+1). And, the IR and CP' steps for the input datum received at the cycle (a+1), the II step for the input data exchanged at the cycle (a+1), the ID step for the CP' results exchanged at the cycle (a+1) and the ID2 step for the ID results exchanged at the cycle (a+1) are continuously performed during the cycle (a+1). Thereby, an ID2 result can be obtained each communication cycle.

A BBW (Brake By Wire) control system used in a vehicle utilizing the mutual node monitoring procedure of FIG. 10 or 12 and having the FIG. 9 configuration will be described below.

The detailed system configuration is as follows: FlexRay is used as the communication protocol for the network 6, and ECU (Electric Control Unit) nodes 1, 2 and 3 are connected to the FlexRay network. To each of the ECUs 1 and 2 is connected, via a current controlling inverter, a steering motor, which actuates the front axle to change the steering angle. The ECU 3 calculates target values for the front wheel steering angles from various parameters such as the steered angle of the steering wheel and the vehicle speed, and also calculates current command values for the steering motors of the ECUs 1 and 2 by using, in addition to such parameters as described above, the difference between the target values and the actual steering angles. The calculated current command values are sent, via the network 6, to the ECUs 1 and 2, which in turn control the respective steering motors based on the command values.

The vehicle speed is measured using a vehicle speed sensor and is transmitted to the ECU 3 via a CAN (Controller Area Network). The ECU 3 receives actual values of the front wheel steering angles from the ECUs 1 and 2 via the network 6, and uses them to calculate current command values for the steering motors.

The steered angle of the steering wheel is measured using a resolver and transmitted to the common-input-value determining units 41-1 to 41-3 of the ECUs via the communication line 910. The steered angle of the steering wheel is used as the input data for the mutual node monitoring procedure. And, the backup steering control of the system is used as the common-operation for the CP procedure. The backup control is a simple control calculation which calculates target values for the front wheel steering angles using only the steered angle of the steering wheel and calculates current command values for the steering motors using only the differences between the target values and the current steering angles.

When the control application confirms by the mutual node monitoring procedure that all ECUs are normal, the ECUs 1 and 2 control the respective steering motors based on the current command values sent from the ECU 3. When the mutual node monitoring procedure notifies the control application (by setting the node fault flag for the ECU 3) that the ECU 3 suffers from a fault, the ECUs 1 and 2 control the currents of the respective steering motors by using their own backup controls. When the mutual node monitoring procedure identifies a fault in the ECU 1, the ECU 3 calculates a greater-than-normal current command value for the steering motor of the ECU 2 and transmits it to the ECU 2 so that the front axle can be actuated by the steering motor of the ECU2 alone.

In this manner, the steering control can be continued even when a fault occurs in the ECUs. By using such a combination of the mutual node monitoring procedure and a backup control, a robust control system can be constructed.

INDUSTRIAL APPLICABILITY

Distributed control systems are used in a wide variety of industrial fields such as vehicles, construction machines and FA (Factory Automation). By applying the present invention to such a distributed control system, high system reliability can be achieved. Further, the invention can be implemented without the need of extra devices such as a monitoring node; thus, a highly reliable system is provided at low cost.

What is claimed is:

1. A distributed system having a plurality of nodes connected by a network, each node comprising:

a common-parameter-value inputting unit for inputting, from the network, a common-parameter-value commonly input to each node of the plurality of nodes, where a value of the common-parameter-value varies according to progress of time as an input parameter value to be used in executing a predetermined common-operation;

a common-operation execution unit for executing the predetermined common-operation which includes an arithmetic operation using, as its input, the common-parameter-value;

a send/receive unit for exchanging, via the network, common-operation execution results of the common-operation execution, with the other nodes; and a fault identification unit that compares the common-operation execution results collected from all the nodes and determines that an error occurs if not all the results are the same.

2. The distributed system according to claim 1, wherein, in the fault identification unit, when a majority of the nodes have a same said common-operation execution result, nodes having a different result are determined to be erroneous.

3. The distributed system according to claim 1, wherein the operations of the common-parameter-value determining unit, common-operation execution unit, send/receive unit and fault identification unit are synchronized with the communication cycles of the system; and a plurality of procedures, each for identifying a fault that occurs during a corresponding one of the cycles, are executed in parallel during one of the cycles.

4. The distributed system according to claim 1, wherein the input parameter is timing information shared by all the nodes.

5. The distributed system according to claim 1, wherein the common-parameter-value determining unit is configured with hardware.

6. The distributed system according to claim 1, wherein the common-operation execution unit uses, as its input, a value of the input parameter before the determination of the common-parameter-value; the send/receive unit performs the exchange of the parameter values used for the determination of the common-parameter-value and the exchange of the common-operation execution results at a same timing; and the fault identification unit continuously performs the determination of the common-parameter-value and the comparison of the common-operation execution results and determines that the comparison result is valid only when the parameter value used for the common-operation execution is equal to the common-parameter-value.

* * * * *